United States Patent Office 2,840,566
Patented June 24, 1958

2,840,566

PREPARATION OF N-VINYL ETHYLENE UREA COMPOUNDS

Robert S. Yost, Oreland, Pa., assignor to Rohm & Haas Company, Philadelphia, Pa., a corporation of Delaware No Drawing. Application April 8, 1955
Serial No. 500,300

5 Claims. (Cl. 260—309.7)

This invention relates to a new and improved process for the production of 1-vinyl-2-imidazolidinone (sometimes called simply vinylethyleneurea or N-vinyl-N,N'-ethyleneurea) of Formula I:

I 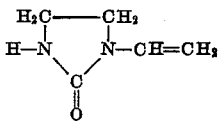

The new process for producing the vinyl ethyleneurea of Formula I is to remove hydrogen chloride from the N-(β-chloroethyl)-N,N'-ethyleneurea of Formula III.

III 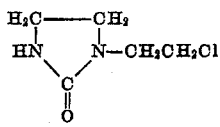

This may be effected by dissolving the compound of Formula III in toluene, xylene, benzene or petroleum ether or other hydrocarbon solvent, adding 1% of a polymerization inhibitor such as that mentioned hereinabove and then heating the solution. The temperature may be from 50° C. to 120° C. Conveniently the solution may be heated to reflux temperatures. For each mole of the compound of Formula III one mole of an alkali metal alkoxide, such as sodium methoxide, is added preferably before beginning to heat. During the heating stage, methanol distills off starting at about 66° C.; then toluene is gradually distilled and the reaction vessel is swept with toluene or other hydrocarbon solvent until methanol is completely removed, at which time the temperature generally rises to the temperature of the toluene or other hydrocarbon solvent. When all the methanol is driven off, the reaction medium is filtered to remove the salt, such as sodium or potassium chloride. It is then heated to distill off the toluene. Before or after such stripping of toluene, additional inhibitor may be added. The vinyl urea of Formula I may be distilled at reduced pressure. The N-vinyl-N,N'-ethyleneurea may be purified by recrystallization, as in the following examples, from such solvents as ether and hexane. This procedure generally produces the vinyl urea of Formula I in a 20% to 67% yield. It is accompanied by the present invention, it is unaccompanied by divinyl ureas which necessarily accompany the prior known procedure involving the reaction of N,N'-ethyleneurea with acetylene.

In the following examples, which are illustrative of the invention, the parts and percentages are by weight unless otherwise noted:

*Example 1*

In a reaction vessel fitted with mechanical stirrer, thermometer, dropping funnel and reflux condenser were placed 260 parts of N-(β-hydroxyethyl)-N,N'-ethyleneurea and 600 parts of anhydrous chloroform. The mixture was heated to reflux and 238 parts of purified thionyl chloride was added dropwise over a period of two hours. Reflux was maintained by the heat of reaction for most of this period. The chloroform was then distilled out of the mixture while 348 parts of anhydrous toluene was added at approximately the same rate at which the chloroform was distilled. Distillation was continued until the vapor temperature reached 110° C. The mixture was refluxed for sixteen hours and then was chilled in an ice bath. The product precipitated and was filtered, washed with cold toluene, and dried at 60° C. to give 268 parts (a 90% yield) of N-(β-chloroethyl)-N,N'-ethyleneurea, M. P. 81.5° to 82° C. One recrystallization from toluene gave a colorless, crystalline product melting at 84.0° to 85.0° C.

*Example II*

In a reaction vessel fitted with condenser and receiver for distillation, stirrer, and dropping funnel was placed 44.6 parts of N-(β-chloroethyl)ethyleneurea, 174 parts of anhydrous toluene, 0.33 part of N,N'-di-2-(1,4-naphthoquinonyl)-p-phenylenediamine (a polymerization inhibitor), and 16.2 parts of powdered sodium methoxide. The mixture was stirred and heated and distillate was taken off as fresh toluene was added to the flask at the same rate. When the vapor temperature reached 110° C., the mixture was filtered to remove sodium chloride, toluene was stripped in vacuo from the filtrate and the residue was distilled to give 20.5 parts of a liquid containing N-vinyl-N,N'-ethyleneurea and boiling in the range of 102° to 112° C. at 0.25 mm. of mercury. The product solidified on cooling. Recrystallization from hexane gave the product N-vinyl-N,N'-ethyleneurea which melted at 78° to 79° C.

It is to be understood that changes and variations may be made without departing from the spirit and scope of the invention as defined in the appended claims.

I claim:

1. A method which comprises heating N-(β-chloroethyl)-N,N'-ethyleneurea in an anhydrous hydrocarbon solvent at a temperature of 50° to 120° C. with a molar equivalent amount of an alkali metal alkoxide of an alcohol having 1 to 5 carbon atoms to react with hydrogen chloride, distilling off the alcohol during the reaction, then filtering the remaining material to remove alkali metal chloride, and distilling the solvent to leave N-vinyl-N,N'-ethyleneurea.

2. A method which comprises heating N-(β-chloroethyl)-N,N'-ethyleneurea in an anhydrous hydrocarbon solvent at a temperature of 50° to 120° C. with a molar equivalent amount of an alkali metal methoxide to react with hydrogen chloride, distilling off the methanol during the reaction, then filtering the remaining material to remove alkali metal chloride, and distilling the solvent to leave N-vinyl-N,N'-ethyleneurea.

3. A method which comprises heating N-(β-chloroethyl)-N,N'-ethyleneurea in a hydrocarbon solvent at a temperature of 50° to 120° C. with a molar equivalent amount of sodium methoxide to react with hydrogen chloride, distilling off the methanol during the reaction, filtering the remaining material to remove sodium chloride, and distilling off the hydrocarbon solvent to leave N-vinyl-N,N'-ethyleneurea.

4. A method of claim 3 in which the heating and subsequent distillation steps are carried out in the presence of an inhibitor to hinder addition polymerization of the vinyl compound.

5. A method for producing N-vinyl-N,N'-ethyleneurea which comprises heating N-(β-chloroethyl)-N,N'-ethyleneurea in toluene at a temperature between 50° and 120° C. with a molar equivalent amount of sodium methoxide to remove hydrogen chloride, distilling off the methanol, filtering to remove sodium chloride, and distilling off the toluene.

References Cited in the file of this patent

UNITED STATES PATENTS 2,514,152 Cairns _____ Feb. 13, 1951

OTHER REFERENCES

Meisenheimer: Beilstein, 4th Ed., 23:153, 2d supp. (1954).

Aniwers: Beilstein, 4th Ed., 23:123, 2d Supp.

Clermo et al.: Beilstein, 4th Ed., 20:282, 2d Supp. (1953).

Meisenheimer: Beilstein, 4th Ed., 20:170, 2d Supp. (1953).